United States Patent [19]

Buehl et al.

[11] Patent Number: 4,661,874

[45] Date of Patent: Apr. 28, 1987

[54] LOW FRICTION CLEANER FOR MAGNETIC TRANSDUCER HEAD

[75] Inventors: G. Thomas Buehl, Columbia; Leemer Cernohlavek, Fulton, both of Mo.

[73] Assignee: International Jensen Incorporated, Schiller Park, Ill.

[21] Appl. No.: 616,554

[22] Filed: Jun. 1, 1984

[51] Int. Cl.⁴ .............................................. G11B 5/41
[52] U.S. Cl. ..................................................... 360/128
[58] Field of Search ........................................ 360/128

[56] References Cited

U.S. PATENT DOCUMENTS

| | | | |
|---|---|---|---|
| 3,439,922 | 4/1969 | Howard | 360/128 |
| 3,789,452 | 2/1974 | Nemoto | 360/128 |
| 3,810,230 | 5/1974 | Orlowski et al. | 360/128 |
| 3,827,699 | 8/1974 | Waugh | 360/128 |
| 3,931,643 | 1/1976 | Kuroc | 360/128 |
| 4,065,798 | 12/1977 | Sugisaki | 360/128 |
| 4,266,256 | 5/1981 | Kato | 360/128 |
| 4,408,241 | 10/1983 | Ogawa | 360/128 |

FOREIGN PATENT DOCUMENTS

| | | |
|---|---|---|
| 48-15859 | 5/1973 | Japan . |
| 51-2597 | 1/1976 | Japan . |
| 51-52965 | 12/1976 | Japan . |
| 52-4453 | 2/1977 | Japan . |
| 52-6262 | 2/1977 | Japan . |
| 52-118617 | 9/1977 | Japan . |
| 92601 | 9/1980 | Japan . |
| WO01905 | 7/1981 | World Int. Prop. O. . |
| 1553550 | 9/1979 | United Kingdom . |

Primary Examiner—Robert S. Tupper
Attorney, Agent, or Firm—Willian Brinks Olds Hofer Gilson & Lione Ltd.

[57] ABSTRACT

A cleaning tape for an apparatus of the type which includes a magnetic head and a drive mechanism for the head includes a cleaning member adapted to be moved past the magnetic head during a cleaning operation. The cleaning tape defines an array of raised surfaces, at least some of which are separated by smooth, low friction surfaces interposed therebetween. The raised surfaces and low friction surfaces are arranged such that both the raised surfaces and the low friction surfaces alternately come into contact with the magnetic head during a cleaning operation. The raised surfaces are effective to clean the magnetic head, and the low friction surfaces are effective to reduce friction between the cleaning member and the magnetic head to protect the drive mechanism against excessive frictional loading. A press forming method is disclosed for fabricating the cleaning tape.

20 Claims, 4 Drawing Figures

LOW FRICTION CLEANER FOR MAGNETIC TRANSDUCER HEAD

BACKGROUND OF THE INVENTION

The present invention relates to an improved head cleaner which provides effective cleaning action while reducing friction between the head cleaner and the head being cleaned.

A wide variety of head cleaners have been used in the past. For example, Ogawa U.S. Pat. No. 4,408,241, assigned to the assignee of the present invention, discloses one effective cleaning tape. This cleaning tape utilizes a combination of ridged surfaces and adhesive to clean a tape head and to trap debris removed from the tap head on the adhesive.

Although the Ogawa cleaning tape has been found effective in operation, it can exhibit drawbacks in certain applications. For example, with certain video cassette recorders, the relatively high friction between the Ogawa cleaning tape and the tape drum of the recorder can cause excessive loads to be applied to the tape head drive mechanism of the recorder.

SUMMARY OF THE INVENTION

The present invention is directed to an improved cleaning member for use with magnetic heads such as magnetic tape heads, which cleaning member exhibits reduced friction between the head being cleaned and the cleaning member, and to a method for fabricating such an improved cleaning member.

According to this invention, a cleaning device for an apparatus of the type comprising a magnetic head and a drive mechanism is provided. The cleaning device includes a cleaning member adapted to be moved past the magnetic head during a cleaning operation, and an array of raised surfaces defined by the cleaning member. At least some of these raised surfaces are separated by smooth, low friction surfaces interposed therebetween. The raised surfaces and the low friction surfaces are arranged such that both the raised surfaces and the low friction surfaces alternately come into contact with the magnetic head during the cleaning operation. The raised surfaces are effective to clean the magnetic head, and the low friction surfaces are effective to reduce friction between the cleaning member and the magnetic head to protect the drive mechanism against excessive frictional loading.

As pointed out above, the present invention provides important advantages in terms of reduced friction between the cleaning member and the magnetic head being cleaned during the cleaning operation. The drive mechanism can either move a magnetic storage medium such as a tape or a disc past the magnetic head, or it can move the magnetic head past the storage medium.

According to another aspect of this invention, a cleaning member of the type described above is formed by placing a flat cleaning member between a platen and an opposed die, wherein the die defines at least one raised surface, and at least one adjacent smooth, low friction surface. The die is then pressed against the platen under sufficient heat and pressure to form raised surfaces and low friction surfaces in the cleaning member corresponding to the respective aligned raised surfaces and low friction surfaces of the die. In this way, a cleaning member of the type described above can be formed in a particularly simple, effective and reliable manner.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
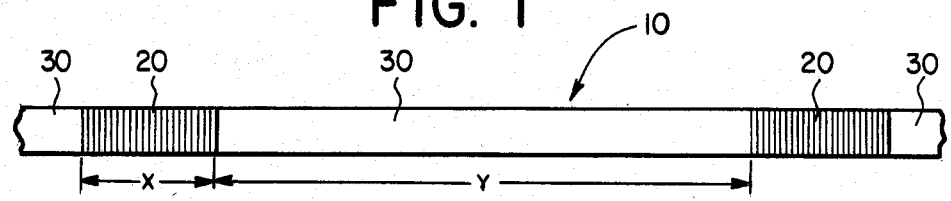
FIG. 1 is a plan view of a cleaning tape which incorporates a presently preferred embodiment of this invention.

Turning now to the drawings, FIG. 1 shows a plan view of a cleaning tape 10 which incorporates a presently preferred embodiment of this invention. This cleaning tape 10 is adapted to clean the magnetic head of a video cassette recorder, and it defines a series of ridged cleaning surfaces 20. Adjacent ones of the ridged cleaning surfaces 20 are separated by smooth, low friction surfaces 30. As explained below in greater detail, the ridged cleaning surfaces 20 are made up of an array of transversely oriented ridges 22 which are stamped or heat formed into the cleaning tape 10. The transverse ridges 22 act to clean the magnetic heads, and the smooth, low friction surfaces 30 act to reduce friction between the cleaning tape and the magnetic heads during the cleaning operation.

In this preferred embodiment, the cleaning tape 10 is 55 inches in length and defines six separate ridged cleaning surfaces 20. The cleaning tape 10 is attached to appropriate leader tape in the conventional way and installed in a conventional video tape cartridge to form a head cleaning cartridge.

Preferably, when the cleaning tape 10 is to be used in VHS video cassette recorders, the cleaning tape 10 is formed from aluminized oriented polyester, such as Mylar, having a blue polyester overcoating on each side such that the optical density of the cleaning tape 10 is no less than 4. In this way, the optical sensors of the VHS video cassette recorder are not activated. A suitable material for use in forming the cleaning tape 10 can be purchased from ThermoCo, Thurmont, Maryland, as Part No. SE100BL, 92 gauge. This material is slit to the standard ½ inch width for use as a video head cleaner. When the cleaning tape 10 is to be used with BETA video cassette recorders, it is preferably formed from a clear, oriented polyester such as Mylar. Suitable materials can be obtained from DuPont.

Figure 2:
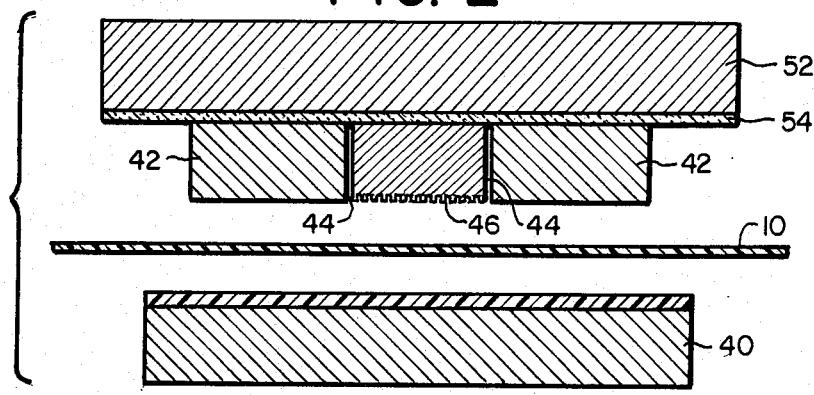
FIG. 2 is a schematic side view of a stamping apparatus for forming the cleaning tape of FIG. 1.
Figure 3:
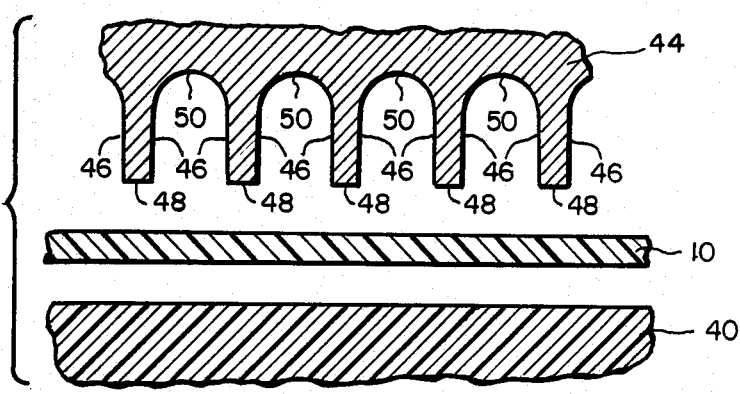
FIG. 3 is a fragmentary enlarged view of a portion of the apparatus of FIG. 2.

FIGS. 2 and 3 illustrate the presently preferred method for forming the cleaning tape 10. As shown in FIG. 2, the cleaning tape 10 is heat formed between a platen 40 and a composite die made up of a centrally located ridged die 44 bracketed by two smooth dies 42. In the embodiment shown in FIG. 2, the platen 40 defines a resilient surface formed of silicone rubber. The two smooth dies 42 define smooth surfaces, and the entire face of the ridged die 44 defines transverse ridges 46. The smooth dies 42 and the ridged die 44 are rigidly mounted to a backing plate 52, and are thermally insulated from the backing plate 52 by a layer of insulation 54.

FIG. 3 shows an enlarged side view of the platen 40, the cleaning tape 10 prior to formation of the ridges 22, and a portion of the ridged die 44. As shown in FIG. 3, the ridged die 44 defines a plurality of transverse ridges 46. Adjacent ones of the ridges 46 are separated by depressions 48, and each of the ridges 46 defines a flat upper surface 48.

Purely by way of example, in this preferred embodiment the overall length of the ridges die 44 along the length of the cleaning tape 10 is 1.5 inches. This means that the length of the ridged cleaning surfaces designed by the reference symbol X in FIG. 1 is 1.5 inches. In the ridged die 44, the flat upper surfaces 48 are 0.004 inch in length (measured along the length of the cleaning tape 10) and the recesses or depressions 50 are 0.010 inches long along the length of the cleaning tape 10. The recesses or depressions 50 in this embodiment are 0.015 inches in depth such that the cleaning tape 10 does not contact the bottom of the depressions 50. In this preferred embodiment, the length of the smooth, low friction surfaces 30, designated by the reference symbol Y in FIG. 1, is 6.5 inches.

In utilizing the apparatus of FIG. 2 to heat form the cleaning tape 10, the ridged die 44 is preferably heated in this exemplary embodiment by means of electric heaters in the die 44 to a temperature of 455° F. plus or minus 5° F. The two smooth dies 42 are positioned adjacent to the ridged die 44 at the same level, and these two smooth dies 42 are kept at a temperature of no more than 150° F. The smooth dies 42 are separated from the ridged die 44 by an air gap of approximately 0.015 inch to reduce heat transfer from the ridged die 44 to the smooth dies 42. The smooth dies 42 are pressed against the cleaning tape 10 at the same time and with the same pressure as the ridged die 44. The smooth dies 42 hold the cleaning tape 10 tightly so that distortion of the cleaning tape 10 caused by dimensional changes in the section under the ridged die 44 is confined to the 0.015 inch air gaps between the ridged die 44 and the smooth dies 42. Thus, these distortions look like and behave like an additional cleaning groove at each end of the ridged cleaning surface 20. Of course, either multiple pressing operations or a large composite die with multiple ridged dies 44 can be used to fabricate the cleaning tape 10.

The process described above produces the cleaning tape 10 with the cleaning surface adjacent the platen 40. This cleaning surface in the region of the ridged cleaning surfaces 20 is provided with sharp corners formed as a combination of the deformation caused by the ridged die 44 and the displacement of material at the surface of the cleaning tape 10. The side of the cleaning tape 10 formed adjacent to the ridged die 44 has relatively smooth corners since they are formed only by the depressions 50 between the ridges 46. The cleaning side of the cleaning tape 10 provides good cleaning action and the reverse side of the cleaning tape 10 provides some cleaning action for guides without high sliding friction.

Figure 4:
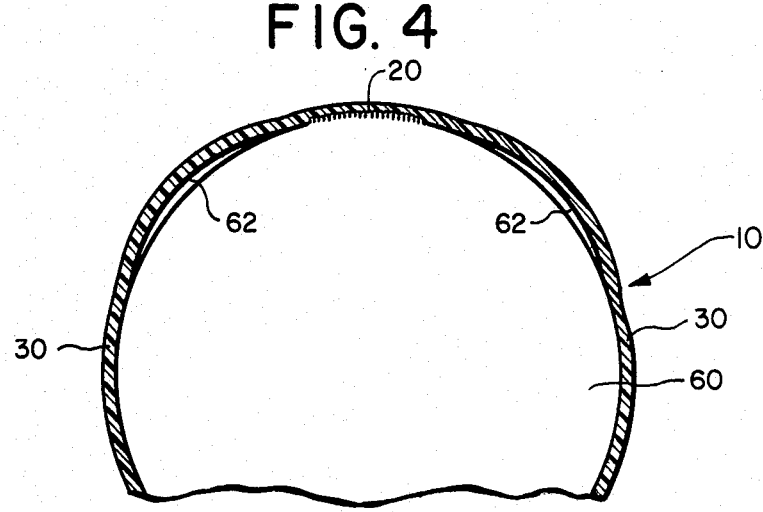
FIG. 4 is a schematic view showing the manner in which the cleaning tape of FIG. 1 can be used to clean a tape drum of a video tape recorder.

In use as shown in FIG. 4, the cleaning tape 10 is moved across a head drum 60 of a video cassette recorder, for example. This head drum 60 defines a number of magnetic heads 62. The ridged cleaning surfaces 20 exert relatively high friction against the head drum 60. However, the smooth, low friction surfaces 30 exert markedly lower levels of friction against the head drum 60. By alternating the low friction surfaces 30 between adjacent ones of the cleaning surfaces 20, the cleaning tape 10 provides an excellent cleaning action without excessive friction against the head drum 60. In this embodiment, the cleaning surfaces 20 tend to slow down the head speed of the video cassette recorder and, if uninterrupted, may actually stop some sensitive machines. However, since in this embodiment the cleaning surfaces 20 are only 1.5 inches in length, the adjacent smooth, low friction surfaces 30 allow the video tape recorder to return to normal speed during the period one of the low friction surfaces 30 is in contact with the head drum 60. For this reason, even sensitive video cassette recorders can run the entire length of the cleaning tape 10 without stopping. In this embodiment, such sensitive video cassette recorders will on occasion slow down while one of the ridged cleaning surfaces 20 is in contact with the head drum 60. However, the video cassette recorder will regain its normal speed during the time the smooth, low friction surface 30 is in contact with the head drum 60.

From the foregoing, it should be apparent that an improved, low friction cleaning tape has been described which provides important advantages in terms of reducing friction between the cleaning tape and the magnetic head during the cleaning operation.

Of course, it should be understood that a wide range of changes and modifications can be made to the preferred embodiments described above. For example, the present invention is not limited to embodiments in which the cleaning surfaces define ridges, or in which multiple ridges are positioned adjacent to one another. For example, an alternative embodiment of this invention relies on either a single ridge or a cleaning surface which does not define ridges at all, separated by smooth, low friction surfaces. Furthermore, this invention is not limited to cleaning tapes for video cassette recorders. The invention is readily adaptable for use in other types of cleaning members, such as in cleaning tapes for audio tape recorders, or cleaning discs for computer disc drives. Moreover, the present invention can be manufactured by methods such as molding or assembly methods which are different from the stamping or pressing method described above.

It is therefore intended that the foregoing detailed description be regarded as illustrative rather than limiting, and that it be understood that it is the following claims, including all equivalents, which are intended to define the scope of this invention.

We claim:

1. A cleaning device for an apparatus of the type comprising a magnetic head and a drive mechanism, said cleaning device comprising:
   a cleaning member adapted to be moved past the magnetic head during a cleaning operation, said cleaning member defining a length dimension and a width dimension;
   said cleaning member defining an array of spaced cleaning surfaces, each separated along the length dimension by a respective smooth, low friction surface such that the low friction surfaces extend across the entire effective width of the cleaning member between the cleaning surfaces, and the length of the low friction surfaces along the length dimension is greater than the length of the magnetic head along the length dimension to ensure that the magnetic head is maintained out of contact with the cleaning surfaces for selected portions of the cleaning operation;

said cleaning surfaces and low friction surfaces arranged such that both the cleaning surfaces and the low friction surfaces alternately come into contact with the magnetic head during a cleaning operation;

said cleaning surfaces effective to clean the magnetic head;

said low friction surfaces effective to reduce friction between the cleaning member and the magnetic head to protect the drive mechanism against excessive frictional loading.

2. The invention of claim 1 wherein the apparatus comprises a magnetic tape player, wherein the cleaning member comprises a tape, and wherein the tape is mounted in a cassette configured to cooperate with the head of the apparatus.

3. The invention of claim 2 wherein the magnetic tape player is a cassette video tape player.

4. The invention of claim 2 wherein the array of cleaning surfaces comprises an array of ridges extending transversely across the tape.

5. The invention of claim 4 wherein the ridges are arranged in sets and wherein each pair of adjacent sets is separated by a respective one of the low friction surfaces.

6. The invention of claim 5 wherein the sets of ridges are each less than two inches in length and the low friction surfaces are greater than six inches in length.

7. The invention of claim 5 wherein each set of ridges comprises a single ridge.

8. The invention of claim 5 wherein at least some of the sets of ridges comprise a multiplicity of closely spaced ridges, each separated by a distance substantially less than the minimum separation between two adjacent ones of the sets of ridges.

9. The invention of claim 1 wherein each of the cleaning surfaces defines a length along the length dimension, and wherein the length of the low friction surfaces is greater than the length of the cleaning surfaces.

10. A cleaning device for a video cassette recorder of the type comprising a drive mechanism and a magnetic head, said cleaning device comprising:

a cassette housing;

a tape mounted in the cassette housing to come into contact with the magnetic head during a cleaning operation, said tape defining an axial direction;

an array of transverse ridges defined by the tape, said ridges positioned to contact and clean the magnetic head during a cleaning operation;

a plurality of smooth, low friction surfaces defined by the tape between at least some adjacent ones of the ridges, said low friction surfaces having a length measured along the axial direction of the tape which is greater than that of the magnetic head such that the low friction surfaces maintain the magnetic head out of contact with the ridges during selected portions of the cleaning operation;

said low friction surfaces positioned to contact the magnetic head during the cleaning operation and thereby reduced friction between the magnetic head and the cleaning tape in order to reduce the loads applied to the drive mechanism during said selected portions of the cleaning operation.

11. The invention of claim 10 wherein each adjacent pair of said ridges is separated by a respective one of the low friction surfaces.

12. The invention of claim 10 wherein the ridges are arranged in sets, wherein each of the sets is separated by a respective one of the low friction surfaces, and wherein adjacent ones of the ridges in each of the sets are separated by a distance substantially less than the separation between adjacent ones of the sets of ridges.

13. The invention of claim 12 wherein each of the sets of ridges is less than two inches in length and wherein each of the low friction surfaces is greater than six inches in length.

14. The invention of claim 10 wherein the tape is formed of a plastic material, and wherein the low friction surfaces are formed by an uncoated surface of the plastic material.

15. A cleaning device for a magnetic tape apparatus of the type comprising a magnetic head and a tap drive mechanism for moving a tape in an axial direction across the magnetic head, wherein the magnetic head defines a length in the axial direction, said cleaning device comprising:

a cleaning tape adapted to be moved past the magnetic head during a cleaning operation, said tape defining a length dimension and a width dimension;

said cleaning tape defining an array of spaced cleaning surfaces, each separated along the length dimension by a respective smooth, low friction surface such that the low friction surfaces extend across the entire effective width of the cleaning tape between the cleaning surfaces, and the length of the low friction surfaces is greater than the length of the magnetic head to ensure that during a portion of the cleaning operation the magnetic head is entirely out of contact with the cleaning surfaces;

said cleaning surfaces and low friction surfaces arranged such that both the cleaning surfaces and the low friction surfaces alternately come into contact with the magnetic head during a cleaning operation;

said cleaning surfaces effective to clean the magnetic head;

said low friction surfaces effective to reduce friction between the cleaning tape and the magnetic head to protect the drive mechanism against excessive frictional loading.

16. The invention of claim 15 wherein the magnetic tape apparatus is a video cassette recorder.

17. The invention of claim 15 wherein the array of cleaning surfaces comprises an array of ridges extending transversely across the tape.

18. The invention of claim 17 wherein the ridges are arranged in sets and wherein each pair of adjacent sets is separated by a respective one of the low friction surfaces.

19. The invention of claim 18 wherein the sets of ridges are each less than two inches in length and the low friction surfaces are greater than six inches in length.

20. The invention of claim 19 wherein at least some of the sets of ridges comprise a multiplicity of closely spaced ridges, each separated by a distance substantially less than the minimum separation between two adjacent ones of the sets of ridges.

* * * * *

UNITED STATES PATENT AND TRADEMARK OFFICE
CERTIFICATE OF CORRECTION

PATENT NO.  : 4,661,874
DATED       : April 28, 1987
INVENTOR(S) : G. Thomas Buehl It is certified that error appears in the above-identified patent and that said Letters Patent is hereby corrected as shown below:

Title page:

IN THE SECTION ENTITLED "INVENTORS:"

Please delete the reference to a second inventor. The line is to read:   --Inventor:  G. Thomas Buehl, Columbia, Mo.--

IN THE BACKGROUND OF THE INVENTION

In column 1, line 17, please delete "tap head" and substitute therefor --tape head--.

IN THE DETAILED DESCRIPTION OF THE
PRESENTLY PREFERRED EMBODIMENTS

In column 3, line 11, please delete the word "ridges" and substitute therefor --ridged--.

Signed and Sealed this

Third Day of May, 1988

*Attest:*

DONALD J. QUIGG

*Attesting Officer*

*Commissioner of Patents and Trademarks*